Nov. 15, 1955   L. H. FLORA   2,723,432
CLIPS FOR CABLES, CONDUITS AND THE LIKE
Filed May 13, 1953
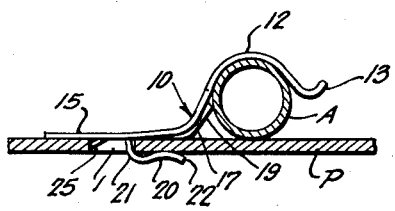
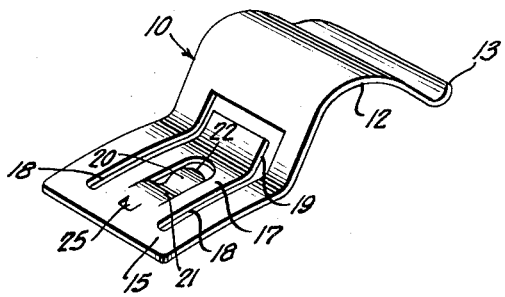
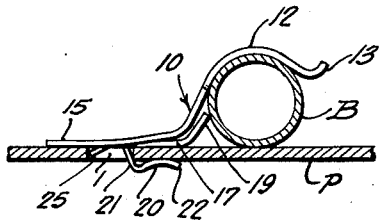
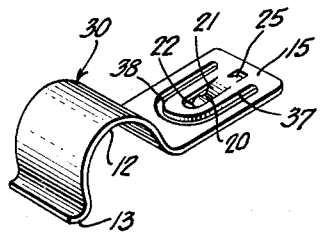
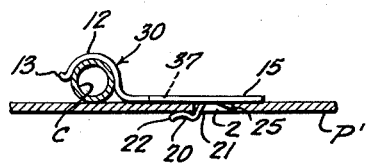
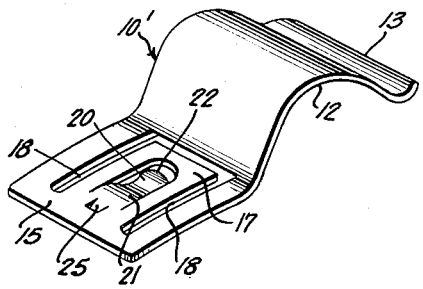
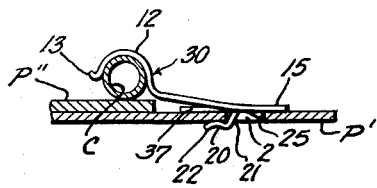
INVENTOR
LAURENCE H. FLORA
BY  H. G. Lombard
ATTORNEY

United States Patent Office 2,723,432
Patented Nov. 15, 1955

2,723,432

CLIPS FOR CABLES, CONDUITS AND THE LIKE

Laurence H. Flora, Cleveland, Ohio, assignor to Tinnerman Products, Inc., Cleveland, Ohio, a corporation of Ohio Application May 13, 1953, Serial No. 354,746

6 Claims. (Cl. 24—73)

This invention relates in general to clips or fasteners for securing cables, conduits, rods, and like objects onto a supporting structure and deals, more particularly, with improved constructions for clips or fasteners of this character which are adaptable for securing various sizes of such objects of different cross-sectional dimensions or for securing such an object on either a plane surface or on a raised surface above the support to which the clip or fastener is attached.

In many instances, the construction of a clip or fastener for securing a cable or conduit or like object, is such that it is suitable only for securing such an object in a single size or cross-sectional dimension, and accordingly, a complete line of such clips in different sizes must be provided for securing various sizes of such objects in different cross-sectional dimensions. In other instances, where any such cable or conduit or similar object is secured along a surface having different levels, it has usually been necessary to provide a specific size of clip for securing the object at each level.

A primary object of the invention, therefore, is to provide an improved construction for clips or fasteners of this character which are made in a single size that is suitable for securing cables, conduits and similar objects in various sizes or for fastening any such object at different levels, as aforesaid, thereby providing important savings and advantages inasmuch as only a single set of dies is required for making the clips and there is no problem of stocking and cataloguing various sizes of clips.

A further object of the invention is to provide such a clip or fastener with an article clamping or holding portion which is yieldable relatively to the attaching portion in what may be termed a floating relation such that said clamping portion is adapted to secure cables, conduits and similar objects in defferent sizes or for fastening such objects at different levels.

Another object of the invention is to provide a clip or fastener of this character in which the floating relation of the clamping portion to the attaching portion of the clip is provided by forming the attaching portion with a partially severed arm member having a free end adjacent the clamping portion of the clip in a manner whereby said clamping portion is yieldable relatively to the attaching portion for the purposes described.

An additional object of the invention is to provide a clip or fastener such as described in which the partially severed arm member is provided on its free end with an abutment which automatically adjusts itself to the size of the object secured and cooperates with the clamping portion of the fastener to retain the object firmly and rigidly in secured position.

A more specific object of the invention is to provide an improved clip or fastener embodying the foregoing features of construction together with a simplified attaching means in the form of an attaching hook and cooperating locking detent provided in the partially severed arm member of the clip for easily and quickly securing the clip in a work opening in a supporting part.

Further objects and advantages and other new and useful features in the construction, arrangement and general combination of elements and details of construction of the improved clips or fasteners of the invention will be readily apparent as the following description proceeds with reference to the accompanying drawings, for purposes of illustration but not of limitation, in which like reference characters designate like parts throughout, and in which:

Fig. 1 is a perspective view of one form of the invention showing the clip or fastener as provided with a partially severed arm member in the attaching portion thereof providing for a floating relation of the clamping portion with respect thereto in a manner whereby said clamping portion is adapted for securing objects of different cross-sectional areas;

Fig. 2 is a sectional view showing the fastener of Fig. 1 in edge elevation as employed to secure one size of conduit, or the like; and, Fig. 3 is a view similar to Fig. 2 showing the same clip as employed to secure a larger size conduit, or the like.

Fig. 4 is a perspective view of another form of fastener in accordance with the invention;

Fig. 5 is a sectional view showing the clip of Fig. 4 in edge elevation as attached to and securing a conduit or similar object on a plane surface; and, Fig. 6 is a view similar to Fig. 5 showing the same clip as employed to secure the conduit on a raised surface above the support to which the clip is attached.

Fig. 7 is a perspective view of a clip or fastener similar to Fig. 1 as provided in a modified construction.

Referring now, more particularly, to the drawings, Fig. 1 shows one form of clip or fastener in accordance with the invention, designated generally 10, which is readily constructed from a simple inexpensive blank of sheet metal provided from standard strip stock with little or no waste of material. The clip or fastener 10 may be made from any suitable sheet metal preferably spring metal such as spring steel or cold rolled steel having spring like characteristics. One end of the sheet metal blank is bent and formed to comprise a generally U-shaped clamping portion 12 adapted for clasping and retaining various objects such as cables, conduits, rods, tubes, or the like, in a predetermined range of sizes measured by the cross-sectional areas thereof. The clamping portion 12 preferably is provided with an outwardly flared end 13 for facilitating the initial insertion and application of an object A or B to secured position under said clamping portion 12, as shown in Figs. 2 and 3.

A base or body portion 15 is formed from the remaining portion of the blank and comprises an arm member 17 which is struck or stamped in said base or body portion 15 and provided with attaching means for attaching the clip or fastener 10 in an opening 1 in a panel P or other support as shown in Figs. 2 and 3. The arm 17 is provided by a generally U-shaped slot or slit area 18 in base 15, Fig. 1, with the bight of said slit area 18 thereof extending toward the clamping portion 12 of the clip. In the form of the invention shown in Figs. 1, 2 and 3, the arm 17 is extended to include an adjacent section of the clamping portion 12 which defines a resilient upturned abutment 19 that cooperates with said clamping portion 12 in the use of the clip or fastener for securing different sizes of objects, as presently to be described.

In the general construction thus provided, the arm 17 of the clip or fastener is adapted to be secured to the supporting part P with the clamping portion 12 yieldable with respect thereto in what may be termed a floating relation by which said clamping portion 12 accommodates itself to various sizes of cables, conduits and similar objects to be secured. The supporting part P to which the fastener is attached may be of any suitable material such as sheet metal, wood, fiber board, or the like; however, inasmuch as the invention is employed mainly in metallic structures, the same is usually in the form of a metallic panel or plate-like element P provided with the necessary attaching openings 1 along the path which the object or part to be secured thereto extends in mounted position thereon. Wherever possible, such an attaching opening 1 is provided as a circular hole which can be punched at the lowest possible cost and with minimum breakage of tools. Any other type of attaching opening, such as a rectangular hole, may also be provided but the overall cost and expense is somewhat greater inasmuch as the tools required are subject to much more frequent breakage.

The arm 17 of the clip or fastener 10 may be attached in such an opening 1 in the supporting part P in any suitable way and in a preferred construction, the attaching means is provided by an integral resilient hook 20, or the like, which is struck and formed from said arm 17 to project from the underside of said arm and the base 15 of the clip or fastener. The resilient hook 20 defines a shoulder 21 adjoining the junction of said hook with the arm 17, while the clasping portion of said hook 20 is spaced from said arm 17 in normal untensioned relation a distance approximating the thickness of the supporting part P. The extremity or free end of said hook 20 terminates in an outwardly flared lip element 22 which facilitates the initial application of the hook 20 over the marginal edge of the attaching opening 1 while the shoulder 21 defined by said hook is shaped in accordance with the contour of said opening 1 in order to fit the edge of said opening 1 snugly and evenly.

At a suitable space from said tongue 20, a depression is formed in the imperforate portion of the base 15 to define a detent 25 projecting from the underside thereof along with said tongue 20. The detent 25 is so provided as to present a pronounced shoulder which is spaced from the shoulder 21 on the hook 20 a distance substantially equal to or slightly less than the diameter of said attaching opening 1. Accordingly, said shoulders 21 and 25 defined by the hook and detent, respectively, are adapted to engage opposing wall portions of said attaching opening 1 to lock the arm 17 firmly and rigidly in attached position in said assembing opening 1. The shoulder 21 on the hook is advantageously provided in slightly inclined relation in the manner of a cam shoulder adapted to cam against the engaged marginal edge of the attaching opening 1 to seat therein in the most effective fastening position. In the event that the attaching opening is of rectangular or other noncircular configuration, the spaced shoulders 21, 25, on the hook and detent, respectively, are suitably shaped in accordance with the contour of such an attaching opening to engage therein as snugly and evenly as possible.

The clip or fastener 10, thus provided, is easily and quickly attached to positive locked fastening position on said supporting part P simply by inserting the free end of the resilient hook 20 into and through said attaching opening 1 and sliding the clip in the direction of the free end of said hook 20. The outwardly flared lip 22 on the extremity of said hook 20 facilitates this initial step in applying the hook 20 by causing a gradual outward flexing thereof over the edge of the attaching opening 1. By depressing the arm 17 of the clip to flex the same downwardly, and simultaneously sliding the clip forward, the hook 20 clears the underside of the supporting part P and permits the clip to be advanced to its fully applied fastening position to the point at which the shoulder 21 on said hook 20 snugly engages the adjacent wall of said attaching opening 1, substantially as shown in Figs. 2 and 3. In this position, the shoulder defined by the detent 25 is also received in the attaching opening 1 in engagement with an opposite wall thereof inasmuch as it is provided wtih a predetermined spacing from the shoulder 21 of the hook for this purpose in order to cooperate therewith in the attaching opening 1 to lock the fastener in fully applied fastening position on the supporting part P. In this relation, the clasping portion of the tongue 20 is in rigid gripping engagement with the marginal portion of the part P adjacent the opening 1 under constant spring tension, while the opposing spaced shoulders 21, 25, cooperate in engagement with opposite walls of the attaching opening 1 to lock the clip in attached position and otherwise prevent endwise displacement or rotative shifting movement of the clip from its applied fastening position. Likewise, in the event that the attaching opening 1 is provided in the form of a rectangular slot, for example, the spaced shoulders 21, 25, engage opposing end walls of the slot with the sides of the hook 20 disposed in abutting engagement with the adjacent straight sidewalls of the slot as a further means maintaining the clip in fixed, nonrotative applied position on the supporting part.

A clip or fastener of this character is advantageously provided with a slightly bowed or arched formation in the arm 17 so that the same is thus provided with added resiliency permitting attachment of the hook 20 to supporting parts of different thicknesses. In a further relation, the locking detent 25 need not necessarily engage in the same attaching opening in the supporting part as the attaching hook 20, but may be arranged to be received in a separate recess therein to lock the fastener in applied fastening position in a manner equivalent to that shown and described. The present arrangement, however, is most practical in that the assembling opening 1 requires only a single, simple hole to be formed, and, by providing for both the attaching hook 20 and locking detent 25 to be received in such attaching opening 1 in the applied fastening position of the device, as aforesaid, the assembly of the clips on the supporting part may be performed with the greatest speed and facility.

In the event that it is desired to remove the clip 10 from attached position, a suitable tool is employed to wedge the base 15 from the supporting part P as necessary to displace the shoulder 25 from its abutting relation with the wall of the assembling opening 1, whereupon the clip may be slid reversely to disengage the attaching hook 20 from the opening 1 and the clip thereby removed.

The clip or fastener 10 attached to the supporting part P as shown in Figs. 2 and 3, is adapted to secure effectively any of a number of objects of different cross sections ranging from an object of relatively small size having a cross section somewhat less than the curvature of the clamping portion 12 to objects of relatively larger size, as seen in Figs. 2 and 3. In general, the normal size of object engaged by the clip or fastener 10 is one in which the clamping portion 12 corresponds substantially to the cross-sectional contour of the object. When the same clip is used in securing larger size objects A or B as shown in Figs. 2 and 3, respectively, the clamping portion 12 readily raises in spaced relation to the support P as necessary to accommodate such larger objects, inasmuch as said clamping portion 12 has the aforesaid floating relation with respect to the arm 17 attached to the support P. In any case, the object A or B is firmly and rigidly secured by the clamping portion 12 under continuously effective spring tension, and when the clearance at the sides of the object A or B adjacent the area engaged by the clamping portion 12 is such that the object might flop or wobble in secured relation under said clamping portion 12, the resilient abutment 19 on the arm 17 automatically seats in bearing relation with the adjacent side of the object A or B to retain said object fixedly and rigidly in secured relation under the clamping portion 12 of the clip in the most effective manner. Thus, as shown in Fig. 2, when an object A is secured, the resilient abutment 19 bears against the inner side of said object A in cooperation with the clamping portion 12 engaging the top and outer side of said object; likewise, when an object B of larger size is secured as shown in Fig. 3, the clamping portion 12 is raised a proportionately greater distance from the support P and the resilient abutment 19 is equally effective in bearing against the inner side of said object B to hold the same fixedly and rigidly in most effective fastening position under the clamping portion 12, as aforesaid.

Figs. 4, 5 and 6 show another form of clip or fastener 30 in accordance with the invention as provided in a construction which is advantageously used in securing an object C along a surface having different levels. By way of illustration, certain areas of the support may comprise a plane surface defined by a single panel P', as seen in Fig. 5, while in other areas such as over a lapped joint, for example, the supporting surface may be defined by superposed plates P', P", or the like, as seen in Fig. 6. In such instances, it is, of course, highly advantageous when the object may be secured at all levels by clips in a single size rather than by a number of different sizes of clips for securing the object at each level.

The clip or fastener 30 has the same general construction as that described with reference to Figs. 1–3, inclusive, and is shown provided in a smaller size with a similar clamping portion 12 having an outwardly flared end 13. The base or body portion 15 is provided with an arm 37 struck and formed therefrom by a generally U-shaped slit area 38 defining said arm 37 with a rounded free end terminating short of the clamping portion 12 of the clip. The arm 37 is provided with similar attaching means comprising a tongue 20 struck and formed therefrom and having a similar shoulder 21 and lip 22 on the free end thereof, together with a locking detent 25 adapted to cooperate with said attaching hook 20 for securing the fastener in an opening 2 in the panel P' in the same general manner as that described with reference to Figs. 1–3, inclusive.

The clip or fastener 30, thus provided, is readily attached in the attaching opening 2 in the supporting part P', Fig. 5, in the usual manner in which the object C is secured on the same surface to which the clip is attached. Inasmuch as the partially severed arm 37 provides for a floating relation of the clamping portion 12 with respect to said arm 37, said clamping portion 12 is adapted to flex readily upwardly, as shown in Fig. 6, as necessary when the object C is secured on the level of part P" above the surface of part P' to which the fastener is secured. Thus, fasteners 30 of the same size are adapted for securing an object C on a plane surface as seen in Fig. 5 or on a raised level as shown in Fig. 6, and of course, on any intermediary level, as well as on a raised surface slightly higher than that of P", Fig. 6, if necessary.

Fig. 7 shows a clip 10' which is similar to that of Fig. 1, but in which the arm 17 is provided in a generally rectangular formation having a straight free end terminating short of the clamping portion 12 of the clip; and, likewise, the clip 30, Fig. 4, may be constructed with the arm 37 thereof provided in a similar generally rectangular formation having such a straight free end.

The clip or fastener, in any form, preferably is constructed of relatively thin sheet metal the thickness of which is selected according to service requirements and the predetermined range of sizes of objects to be secured. The clip or fastener is most effective when provided of spring metal suitably tempered and otherwise treated to give the desired toughness and hardness, particularly in the case of devices intended for heavy duty applications. A cheap and highly satisfactory clip may be provided from cold rolled metal such as cold rolled steel which is untempered but of a spring metal nature and capable of providing an effective and reliable securing device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A clip comprising a piece of sheet metal bent to provide an article clamping portion and an attaching portion comprising a base provided with a partially severed area defining an arm member having a junction with said base and a free end extending toward said clamping portion, said arm member having a partially severed area defining a hook joined directly to said arm member inwardly of said junction of said arm member with said base and projecting from the underside of said arm member, said hook being receivable in an opening in a support to secure said arm member to the support with said clamping portion adapted to yield relatively to said arm member.

2. A clip comprising a piece of sheet metal bent to provide an article clamping portion and an attaching portion comprising a base provided with a generally U-shaped slot defining an arm member having a junction with said base and a free end extending toward said clamping portion, said arm member having a partially severed area defining a hook joined directly to said arm member inwardly of said junction of said arm member with said base and projecting from the underside of said arm member, said hook having its free end extending in the same general direction as the free end of said arm member and being receivable in an opening in a support to secure said arm member to the support with said clamping portion adapted to yield relatively to said arm member, and a locking detent on said attaching portion engageable with said support to lock said hook in applied position in said opening in the support.

3. A clip comprising a piece of sheet metal bent to provide an article clamping portion and an attaching portion provided with a partially severed area defining an arm member having a free end extending toward and into the region of said clamping portion, means for securing said arm member in an opening in a support with said clamping portion adapted to yield relatively to said arm member, and an abutment on the free end of said arm member extending substantially in the contour of said clamping portion and adapted to cooperate with said clamping portion in retaining an article secured by said clamping portion.

4. A clip comprising a piece of sheet metal bent to provide an article clamping portion and an attaching portion provided with a partially severed area defining an arm member having a free end extending toward and into the region of said clamping portion, a hook projecting from the underside of said arm member and receivable in an opening in a support to secure said arm member to the support with said clamping portion adapted to yield relatively to said arm member, and an abutment on the free end of said arm member extending substantially in the contour of said clamping portion and adapted to cooperate with said clamping portion in retaining an article secured by said clamping portion.

5. A clip comprising a piece of sheet metal bent to provide an article clamping portion and an attaching portion comprising a base provided with a partially severed area defining an arm member having a junction with said base and a free end extending toward and into the region of said clamping portion, said arm member having a partially severed area defining a hook joined directly to said arm member inwardly of said junction of said arm member with said base and projecting from the underside of said arm member, said hook being receivable in an opening in a support to secure said arm member to the support with said clamping portion adapted to yield relatively to said arm member, and an abutment on the free end of said arm member extending substantially in the contour of said clamping portion and adapted to cooperate with said clamping portion in retaining an article secured by said clamping portion.

6. A clip comprising a piece of sheet metal bent to provide an article clamping portion and an attaching portion comprising a base provided with a generally U-shaped slot defining an arm member having a junction with said base and a free end extending toward and into the region of said clamping portion, said arm member having a partially severed area defining a hook joined directly to said arm member inwardly of said junction of said arm member with said base and projecting from the underside of said arm member, said hook having its free end extending in the same general direction as the free end of said arm member and being receivable in an opening in a support to secure said arm member to the support with said clamping portion adapted to yield relatively to said arm member, a locking detent on said attaching portion engageable with said support to lock said hook in applied position in said opening in the support, and an abutment on the free end of said arm member extending substantially in the contour of said clamping portion and adapted to cooperate with said clamping portion in retaining an article secured by said clamping portion.

References Cited in the file of this patent

UNITED STATES PATENTS

| | | |
|---|---|---|
| 914,380 | Bishop | Mar. 9, 1909 |
| 2,154,046 | Kost | Apr. 11, 1939 |
| 2,618,033 | Tinnerman | Nov. 18, 1952 |